Aug. 7, 1934.  E. L. OPPERMAN  1,969,474
MOTION PICTURE APPARATUS
Filed March 4, 1932
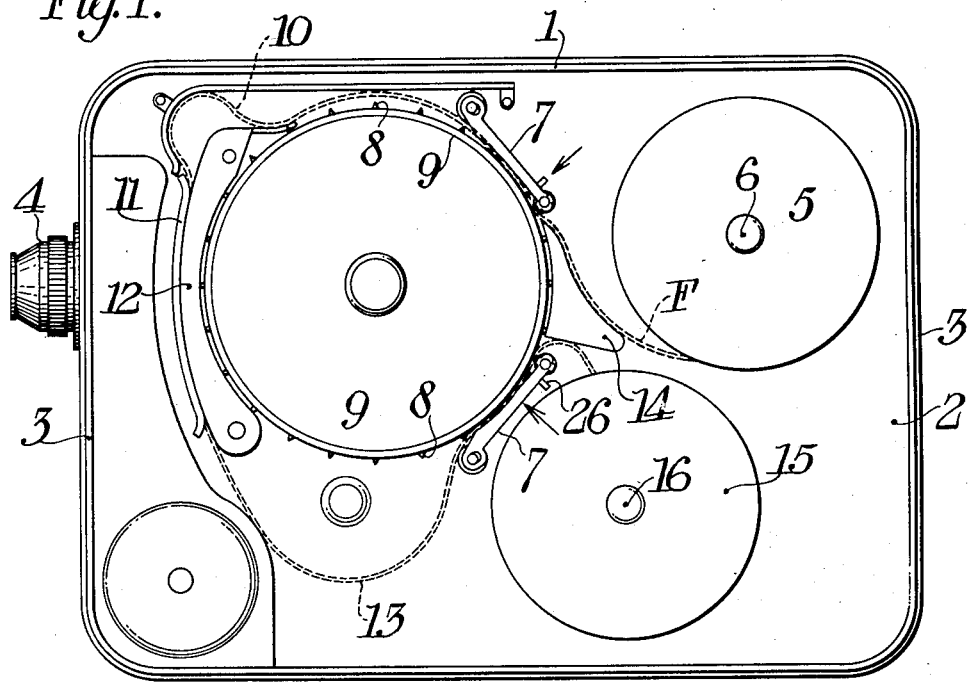
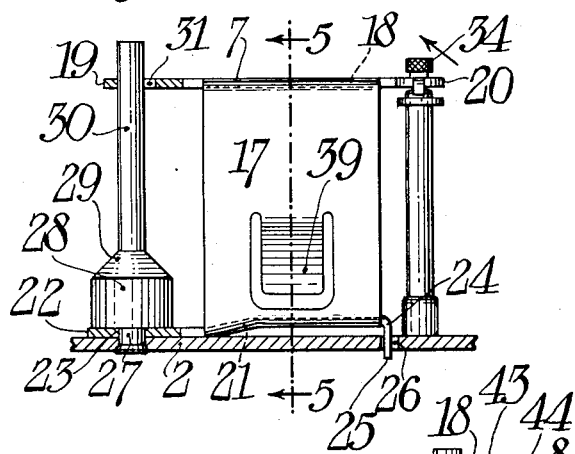
Inventor:
Emil L. Opperman,
Attorneys Patented Aug. 7, 1934

1,969,474

UNITED STATES PATENT OFFICE 1,969,474

MOTION PICTURE APPARATUS

Emil L. Opperman, Rochester, N. Y., assignor to Eastman Kodak Company, Rochester, N. Y., a corporation of New York Application March 4, 1932, Serial No. 596,797

7 Claims. (Cl. 271—2.3)

This invention relates to photography and more particularly to motion picture apparatus. One object of my invention is to provide a means for securely holding a motion picture film on a film moving sprocket. Another object of my invention is to provide such a device with a means for readily positioning the film. Another object of my invention is to provide a film pressing member definitely locked against the normal thrust of a film away from a film sprocket. Another object of my invention is to provide a snap latch for holding a film presser in place and one which can be readily released for threading the motion picture machine. Still another object of my invention is to provide a snap latch which is free from the usual type springs and consists of a single formed up metal part and other objects will appear from the following specification, the novel features being particularly pointed out in the claims at the end thereof.

Coming now to the drawing wherein like reference characters denote like parts throughout:

Fig. 1 is a side elevation of a motion picture machine here shown as a camera construction in accordance with and embodying a preferred form of my invention;

Fig. 2 is an enlarged detail partially in section of a film presser in a latched position;

Fig. 3 is a similar view of a film presser but with the parts in position to release the spring latch;

Fig. 4 is a fragmentary detail end elevation, the hook-like latch member engaging the end of a fixed stud; and Fig. 5 is an enlarged sectional detail taken on line 5—5 of Fig. 2.

While I have described in the accompanying drawing my invention, as applied to a motion picture camera, it is quite obvious that these pressers and sprockets are equally suitable for any motion picture apparatus in which film is adapted to be held upon a sprocket to be moved through the machine. Thus motion picture projectors, printers and the like may be equipped with my improved form of presser member.

In Fig. 1 a typical small motion picture machine is shown as comprising a body portion 1 in which a mechanism plate 2 is mounted around which a wall 3 extends upwardly in a well known manner. The front wall 3 may support a lens mount 4 in which the objective is located.

A supply reel 5 of film may be mounted on the post 6 and a film F may be led from this supply reel under the presser designated broadly as 7 by which it is held in contact with the teeth 8 of the sprocket 9. The film is looped at 10 and is passed through a film gate consisting of members 11 and 12 after which it passes into a loop 13.

The film may be intermittently moved past the gate by means of any known type of pulldown apparatus not shown.

After the loop 13 the film passes a second pressed member 7 which holds the film against the teeth 8 of the sprocket 9 and thence the film passes the partition plate 14 to the take-up reel 15 which is mounted on a shaft 16.

The presser 7 as best shown in Figs. 2 and 3 is preferably made from a flat metal plate. The body portion 17 of this plate is provided with a formed over flange 18 at the top, the ends of this flange being extended at 19 and 20 to each side of the body plate 17.

The lower edge of plate 17 has a similar type of flange 21 which is extended towards both sides, one end 22 supporting a bearing 23 and the other end 24 being bent downwardly forming an end 25 adapted to project through a slot 26 in the mechanism plate 2.

The bearing 23 snugly fits a post 27 which is riveted to the mechanism plate and which has an enlarged end 28 from which a tapered shoulder 29 extends upwardly a short distance, this shoulder terminating in a shaft 30. Shaft 30 and shaft 27 constitute a fixed hinged pintle upon which the presser 7 may turn. The upper arm 19 is provided with a bearing 31 which engages the post 30 in such a manner that the upper lug may slide about as well as turn on the post 30.

The lower bearing 23, however, cannot slide upon post 27 but can merely turn on this post and the enlarged portion 28 above this bearing tends to hold lug 22 flat against the mechanism plate 2.

The lug 20, as best shown in Fig. 4, is provided with a pair of downwardly extending arms 32 and 33, the latter being preferably inturned at the bottom as shown. A handle 34 may be attached to the lug 20, this handle serving to operate the snap latch which is formed by the hook-like member 33 and the rounded top 35 of a fixed member 36. This fixed member is preferably in the form of a stud or post and is attached to the mechanism plate 2 at one end and is provided with a flat head 37 at the other end.

The lug 22 can freely turn on the post 27 but cannot slide on this post. Consequently, if the handle 34 is pushed in the direction shown by the arrow in Fig. 2 and Fig. 3 the narrow arms 32 and 33 are released from the round headed fixed member 35 when the upper lug 19, through its elongated bearing 31, is permitted to slide about the post 30.

This sliding movement bends the lower flange 21 so that the lug 22 actually serves as a spring to normally hold the presser member in its operative position in which the film F may be held against the teeth 8 of the sprocket 9. In this position the snap latch 33—35 is in engagement.

When swinging the presser member to its operative position it is not necessary to press the handle 34 in the direction shown by the arrows since the inwardly curved hook like member 33 can readily snap over the rounded top of the fixed post 36. However, the movement of the presser in the reverse direction cannot take place without rocking the presser 7 upwardly as above described to release the latch member.

The flat plate 17 has a cut-out tongue 39 which, as best shown in Fig. 5, is bent inwardly at 40 in a reverse curve. A flat edge 41 of this member presses against the lower edge of a film F holding it on the smooth raised flange 42 of the sprocket 9. This sprocket has teeth 8 only on the upper edge.

As also shown in Fig. 5 the inwardly turned edge 18 of the plate 17 holds the film F upon the sprocket teeth although there is sufficient space between the inner edge 43 of this flange and the edge 44 of the sprocket to permit the film to move freely without friction.

The lug 25 by extending down into the slot 26 cut in the mechanism plate 2 limits the movement of the presser 7 so that it can only be swung about the hinged pintle a sufficient distance to permit the film to be readily loaded into position.

The operation of this presser is extremely simple. With the pressers in an operative position film F is drawn from a supply roll 5, passed between the presser 7 and the sprocket 9 looped around at 10 is passed through the gate 11—12 and is passed through the opened presser 7 after looping at 13 and is finally attached to the take-up reel 15. Film may then be moved slightly to position it on the teeth 8 of the sprocket and the presser member 7 may be closed by pressing in the direction shown by the arrow in Fig. 1. This pressure causes the hook 33 to ride up over the top of the curved fixed member 35 and snap into place in which place the presser members are firmly held by the snap latch. It will thus be seen that the latching operation takes place when the presser moves radially about the hinged pintle 30 and also when it moves in its own plane, that is, when the presser is moved from the position shown in Fig. 2 to that shown in Fig. 3. This movement in its own plane is permitted by the slot 31 engaging the hinged pintle 30 and by the springiness of member 22 which is only able to turn on the post 27. After the film has been exposed and another film is to be placed in the camera the presser members may be readily opened by pushing the handle 34 in the direction shown by the arrows in Fig. 2 and Fig. 3, thus releasing arm 32 and latch 33 from the rounded knob 35.

While this presser can be very easily operated it is, nevertheless, firmly locked against a movement away from the sprocket 9, such as might be caused by improper winding of the film. At the same time the construction is such that the gate may be readily swung open.

Having thus described my invention, what I claim as new and desire to secure by Letters Patent is:

1. In a motion picture apparatus, the combination with a sprocket for moving film, a presser member for holding said film in engagement with said sprocket, and a stationary shaft for supporting said presser member, of a resilient connection supporting said presser member both for rotation about the axis of said shaft and for movement in a plane through said axis of said shaft.

2. In a motion picture apparatus, the combination with a sprocket for moving film, a presser member for holding said film in engagement with said sprocket, and a stationary shaft for supporting said presser member, of a resilient connection and a loose connection, both between said presser member and said shaft, supporting said presser member both for rotation about the axis of said shaft and for movement in a plane through said axis of said shaft.

3. In a motion picture apparatus, the combination with a sprocket adapted to advance a film, a presser member adapted in operative position to hold said film in engagement with said sprocket, and a stationary shaft for supporting said presser member, of a resilient connection supporting said presser member for rotation about the axis of said shaft and permitting movement of said presser member in a plane through said axis of said shaft, and a latch including a movable member on said presser member and a stationary member adjacent said sprocket, which are adapted in engaging position to hold said presser member in said operative position and which are relatively movable in a plane through the axis of said shaft during movement into said engaging position.

4. In a motion picture apparatus, the combination with a sprocket adapted to advance a film, a presser member adapted in operative position to hold said film in engagement with said sprocket, and a stationary shaft for supporting said presser member, of a resilient connection between said presser member and said shaft, supporting said presser member for rotation about the axis of said shaft and permitting movement of said presser member in a plane through said axis of said shaft, and a latch including one element on said presser member and another element adjacent said sprocket for engaging and holding the first mentioned element in operative position of said presser member, and including co-operating surfaces on said elements for moving said presser member in a plane through the axis of said shaft and against the action of said resilient connection during movement of the presser member into operative position.

5. In a motion picture apparatus, the combination with a sprocket adapted to advance a film, a presser member adapted in operative position to hold said film in engagement with said sprocket, and a stationary shaft for supporting said presser member, of a resilient connection between said presser member and said shaft, supporting said presser member for rotation about the axis of said shaft and permitting movement of said presser member in a plane through said axis of said shaft, and a latch including a catch on said presser member and a round headed post mounted adjacent said sprocket, and co-operating surfaces on said catch and said post to raise said presser member against the action of said resilient connection during movement of the presser member into operative position.

6. In motion picture apparatus, the combination with a sprocket, of a hingedly mounted presser member movable to and from the sprocket, a hinged pintle supporting said presser member, said presser member engaging said hinged pintle with two spaced bearings one bearing apertured to slide and turn upon said pintle and the other bearing closely fitting the pintle being adapted solely to turn thereon.

7. In motion picture apparatus, the combination with a sprocket, of a hingedly mounted presser member movable to and from the sprocket, a hinged pintle supporting said presser member, said presser member engaging said hinged pintle with two spaced bearings one bearing apertured to slide and turn upon said pintle and the other bearing closely fitting the pintle being adapted solely to turn thereon said second mentioned bearing including a resilient arm adapted to spring when said first mentioned bearing slides upon said pintle.

EMIL L. OPPERMAN.